US007251344B2

(12) United States Patent
Sakata et al.

(10) Patent No.: US 7,251,344 B2
(45) Date of Patent: Jul. 31, 2007

(54) IMAGE FORMING APPARATUS

(75) Inventors: Satoshi Sakata, Hachioji (JP); Seitaro Kasahara, Hachioji (JP); Shigeo Konuma, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 791 days.

(21) Appl. No.: 10/441,614

(22) Filed: May 20, 2003

(65) Prior Publication Data
US 2003/0218643 A1 Nov. 27, 2003

(30) Foreign Application Priority Data
May 22, 2002 (JP) ............................. 2002-147753

(51) Int. Cl.
*G06K 9/00* (2006.01)
(52) U.S. Cl. ...................................... 382/100; 345/520
(58) Field of Classification Search ................ 382/100, 382/128; 128/922; 715/729; 345/520
See application file for complete search history.

(56) References Cited

U.S. PATENT DOCUMENTS

| 4,365,691 A | * | 12/1982 | Bevilaqua et al. ........... 187/395 |
| 4,969,096 A | * | 11/1990 | Rosen et al. ................. 434/112 |
| 5,374,924 A | * | 12/1994 | McKiel, Jr. ............. 340/825.19 |
| 5,461,399 A | * | 10/1995 | Cragun ......................... 715/729 |
| 5,600,311 A | * | 2/1997 | Rice et al. .............. 340/825.19 |
| 5,896,129 A | * | 4/1999 | Murphy et al. ................ 725/76 |
| 6,049,328 A | | 4/2000 | Vanderheiden |
| 6,243,682 B1 | | 6/2001 | Eghtesadi et al. |
| 6,259,866 B1 | | 7/2001 | Kabumoto et al. |
| 6,856,333 B2 | * | 2/2005 | Ullmann et al. ............. 715/865 |
| 2001/0012913 A1 | * | 8/2001 | Iliff ............................ 600/300 |
| 2003/0142082 A1 | * | 7/2003 | Spalding ..................... 345/175 |

OTHER PUBLICATIONS

Patent Abstracts of Japan, vol. 1997, No. 4, Apr. 30, 1997 and JP 08-329314 A (Hitachi Ltd.), Dec. 13, 1996—Abstract only.
Patent Abstracts of Japan, vol. 1999, No. 12. Oct. 29, 1999 and JP 11-184368 A (NEC Shizuoka Ltd.), Jul. 9, 1999—Abstract only.

* cited by examiner

*Primary Examiner*—Vikkram Bali
*Assistant Examiner*—Anand Bhatnagar
(74) *Attorney, Agent, or Firm*—Frishauf, Holtz, Goodman & Chick, P.C.

(57) ABSTRACT

An image forming apparatus having an operation improved in view of use of normal healthy persons and handicapped persons. The image forming apparatus comprising an operation panel having a display and an input section, has: a specifying section for specifying whether a user is a normal healthy person or a handicapped person; a storage for storing an operation function when the normal healthy person uses the apparatus, and an operation function when the handicapped person uses the apparatus; and an operation function changing section for reading a corresponding operation function out of the storage, and changing an operation function of the operation panel according as the normal healthy person or the handicapped person is specified by the specifying section.

12 Claims, 8 Drawing Sheets

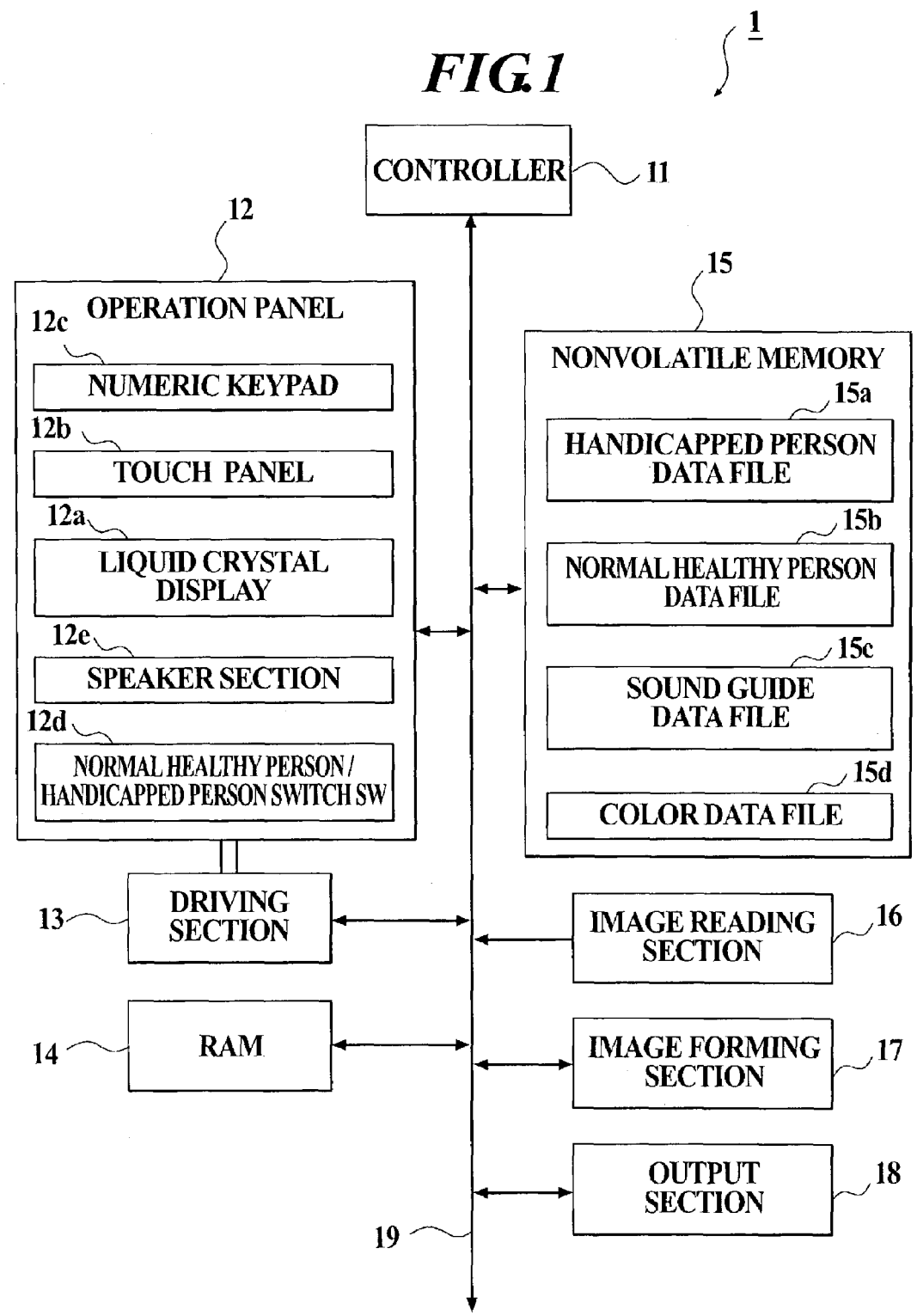

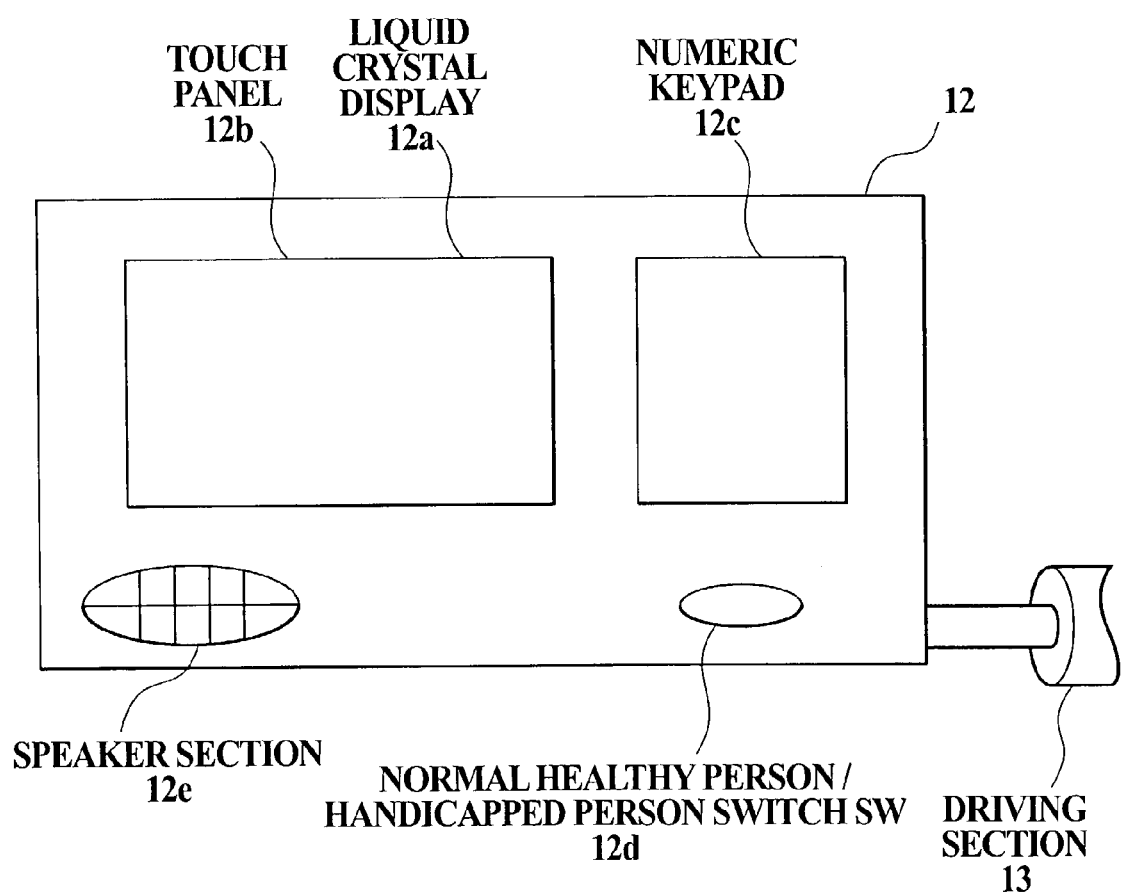

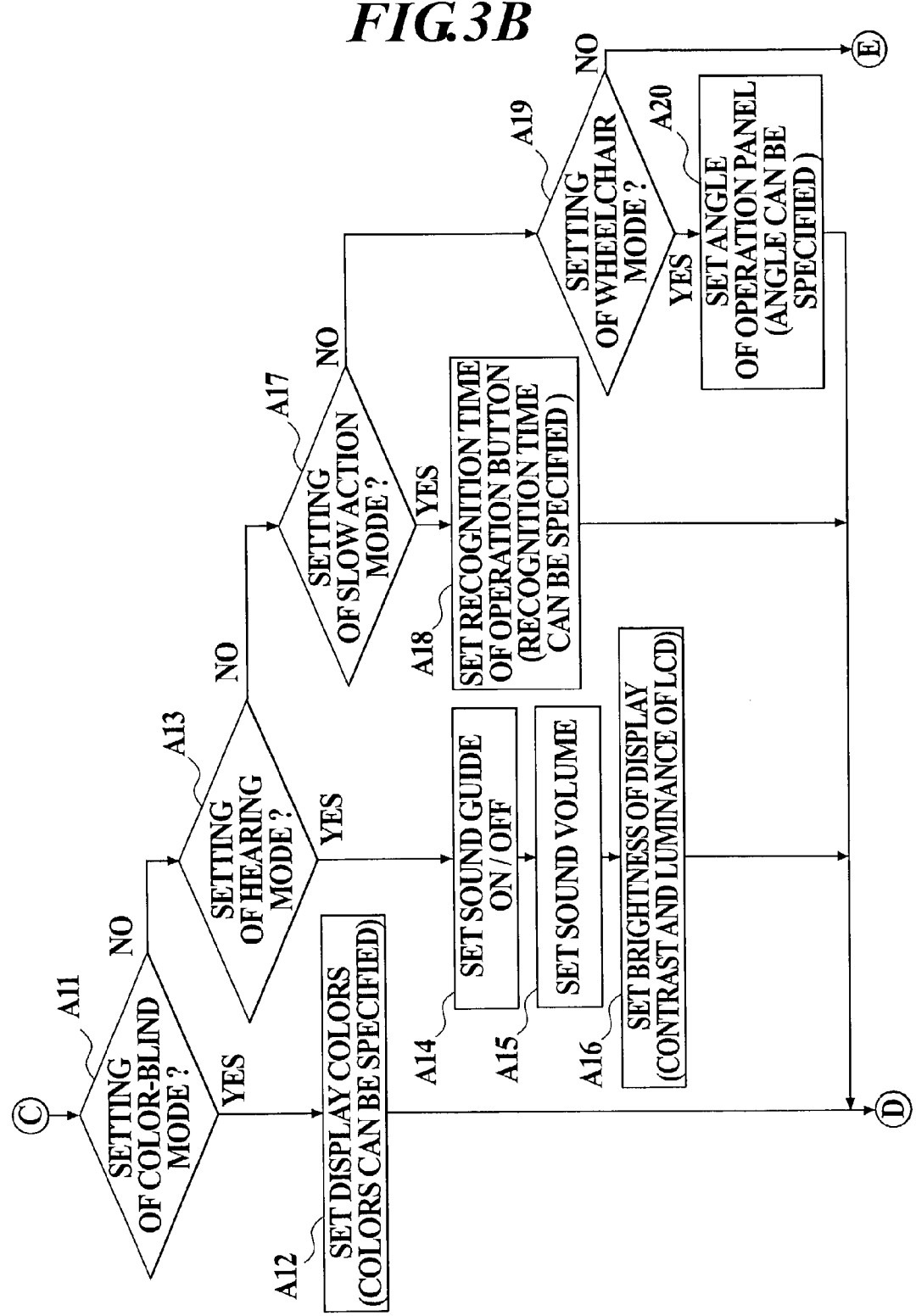

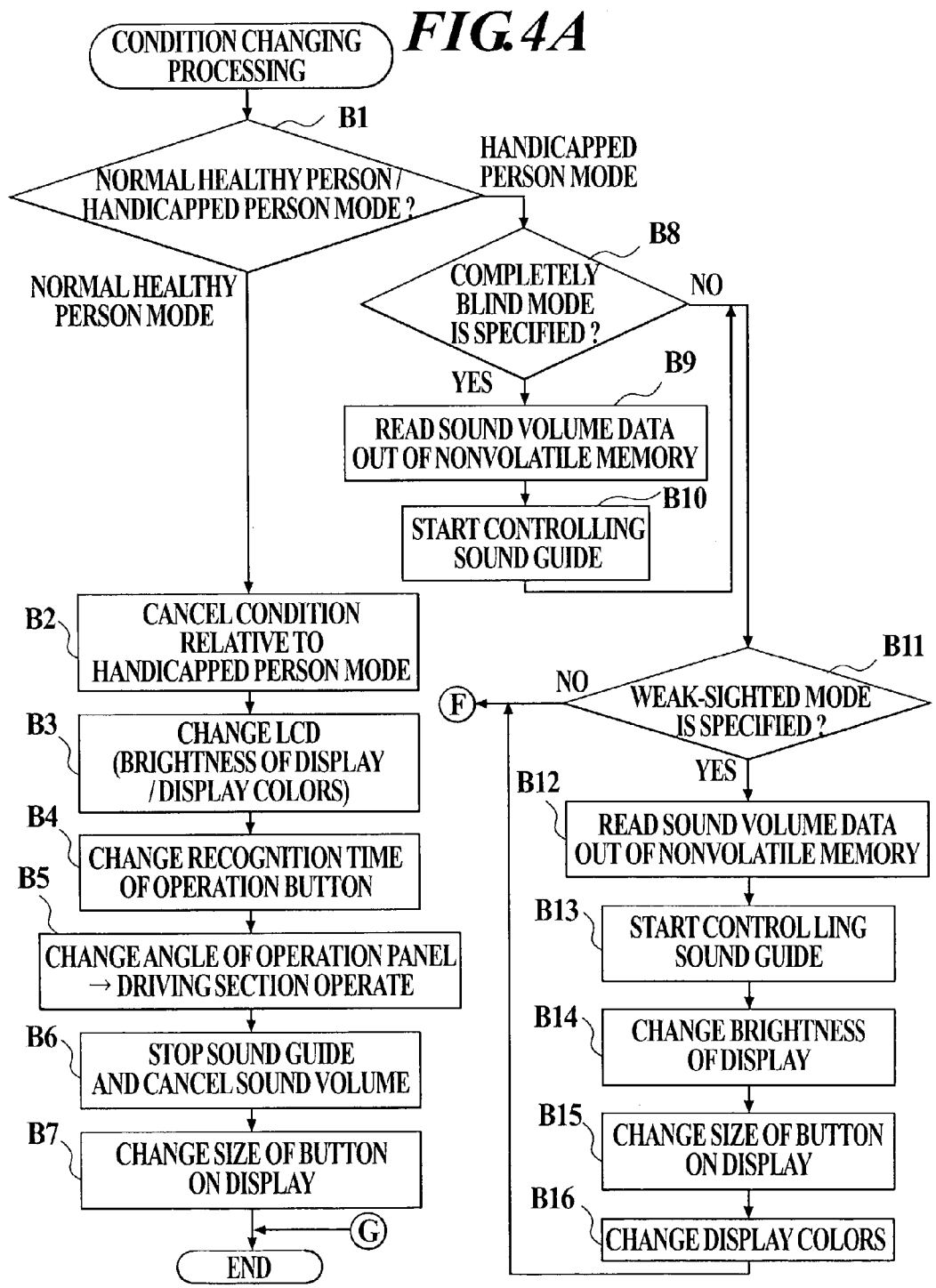

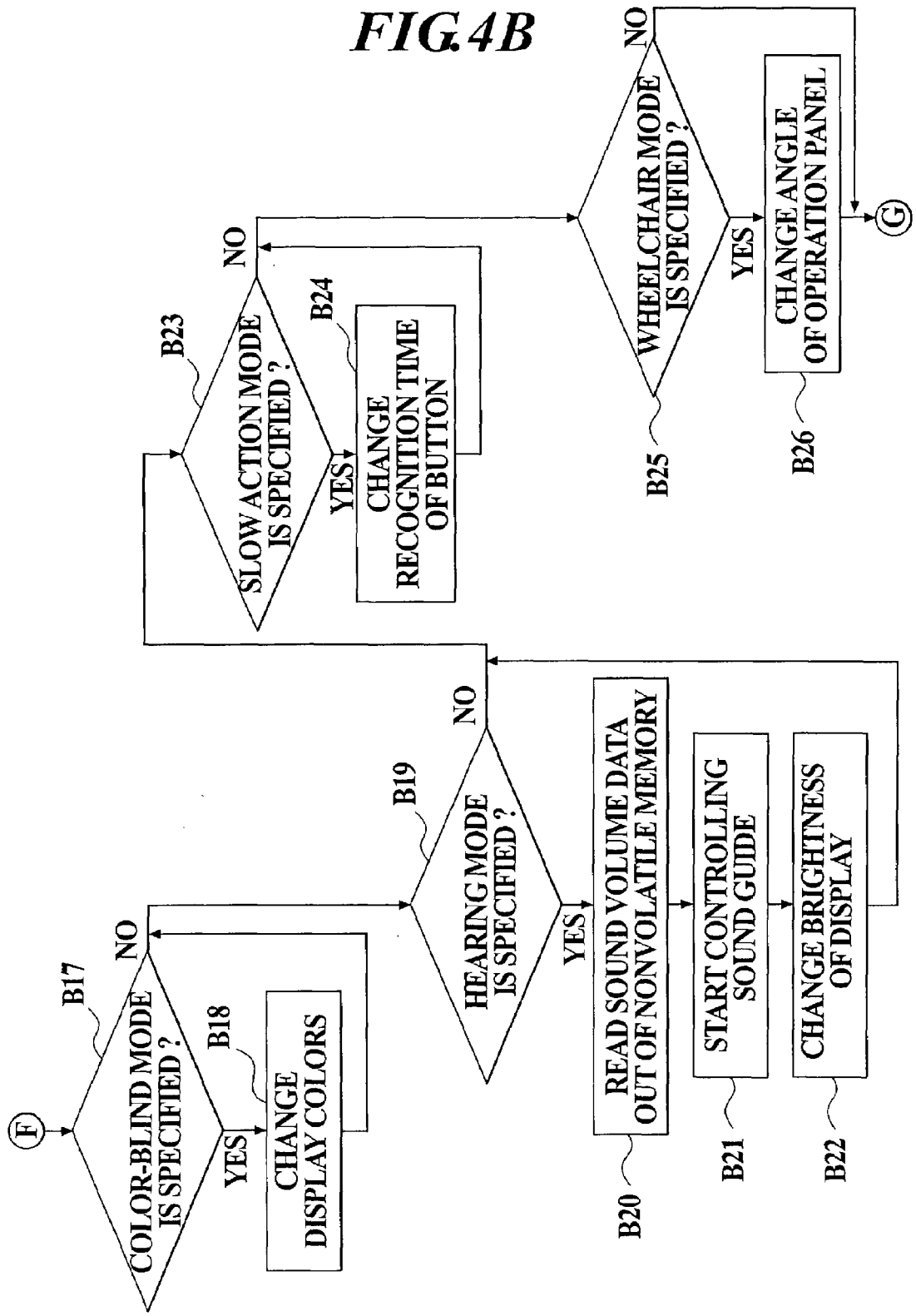

IMAGE FORMING APPARATUS

BACKGROUND OF THE INVENTION

1. Field of the Invention

The present invention relates to an image forming apparatus, and in particular to an image forming apparatus comprising an operation panel having a display and an input section.

2. Description of Related Art

Conventionally, an image forming apparatus comprising an operation panel having a display and an input section is known. Because the operation panel of the image forming apparatus is attached at a position and an operating environment of the operation panel is designed in view of use of normal healthy persons, there is a case wherein it is difficult that handicapped persons operate the operation panel or handicapped persons can not operate the operation panel when they use the image forming apparatus.

Therefore, an image forming apparatus that the position at which the operation panel is attached or the operating environment of the operating panel is improved in view of use of handicapped persons is proposed. For example, the image forming apparatus include one for outputting an operation guide with sounds for the completely blind or the weak-sighted person, one having a long detecting time of various buttons displayed on the display or the input section for the slow action person, one comprising the display having display colors changed from full colors to black and white for the color-blind person or the weak-sighted person, one comprising the operation panel having an angle adjusted so as to be operated easily for the wheelchair user, and so on.

However, when the attachment position or the operating environment of the operation panel of the image forming apparatus is improved in view of use of handicapped persons, normal healthy persons may not use the image forming apparatus easily. For example, when the operation guide is outputted with sounds, normal healthy persons may feel the operation guide noises according to an environment or a place of use of the image forming apparatus. Further, when the detecting time of various buttons displayed on the display or the input section is determined to be long, because the reaction is delayed, the operation may be hindered. Further, the display colors of the display are changed to black and white, normal healthy persons may recognize contents displayed in full colors more easily, that is, normal healthy persons may fell it not easy to recognize contents displayed in black and white. Further, when the angle of the operation panel is adjusted so that the wheelchair user operates the operation panel easily, normal healthy persons may feel it not easy to operate the operation panel.

SUMMARY OF THE INVENTION

The present invention is accomplished in order to solve the above-described problems.

An object of the present invention is to provide an image forming apparatus having an operation improved in view of use of normal healthy persons and handicapped persons.

In accordance with the present invention, an image forming apparatus comprising an operation panel having a display and an input section, comprises: a specifying section for specifying whether a user is a normal healthy person or a handicapped person; a storage for storing an operation function when the normal healthy person uses the apparatus, and an operation function when the handicapped person uses the apparatus; and an operation function changing section for reading a corresponding operation function out of the storage, and changing an operation function of the operation panel according as the normal healthy person or the handicapped person is specified by the specifying section.

According to the apparatus of the present invention, because the operation function of the operation panel is changed according to the user, it is possible to improve the operation of the image forming apparatus in view that normal healthy persons and handicapped persons use the image forming apparatus.

Preferably, in the apparatus of the present invention, the specifying section comprises a toggle switch for switching between the normal healthy person and the handicapped person alternatively, and specifying any one of the normal healthy person and the handicapped person.

According to the apparatus, it is possible to easily specify whether the user is the normal healthy person or the handicapped person by switching the toggle switch alternatively. Further, because the user is always specified, it is possible to smoothly change the operation function according to the user. Furthermore, because the user can be specified by one toggle switch, it is possible to reduce cost of the apparatus.

Preferably, the apparatus of the present invention, further comprises a selecting section for selecting a condition of the handicapped person from a completely blind condition, a weak-sighted condition, a color-blind condition, a hearing condition, a slow action condition and a wheelchair condition, when the user is the handicapped person, wherein the storage stores an operation function when the handicapped person uses the apparatus, according to the condition of the handicapped person selected by the selecting section; and the operation function changing section reads the operation function corresponding to the condition of the handicapped person selected by the selecting section out of the storage, and changes the operation function of the operation panel so as to correspond to the condition of the handicapped person, when the handicapped person is specified by the specifying section.

According to the apparatus, when the user is the handicapped person, the operation function of the operation panel is changed so as to correspond to the condition of the handicapped person. Consequently, for example, it is possible to change a condition such as a sound guide of the operation panel, sound volume, brightness of the display, display colors, a recognition time of an operation button displayed on the display, an angle of the operation panel or the like, according to the condition of the handicapper person (the completely blind condition, the weak-sighted condition, the color-blind condition, the hearing condition, the slow action condition, or the wheelchair condition). As a result, it is possible to improve the operation of the image forming apparatus for handicapped persons.

Preferably, in the above-described apparatus, the selecting section is capable of selecting a plurality of conditions of the handicapped person.

According to the apparatus, because a plurality of conditions of the handicapped person can be selected, it is possible to apply operation functions corresponding to a plurality of conditions of the handicapped person to the operation panel. Consequently, for example, when the condition of the handicapped person includes the completely blind condition and the wheelchair condition, it is possible to change an angle of the operation panel with outputting a sound guide of the operation panel. As a result, it is possible to provide the most suitable operation environment of the image forming apparatus for the handicapped person.

Preferably, the above-described apparatus further comprises a guide section for outputting an operation guide with sounds, wherein the operation function changing section makes the guide section output the operation guide of the operation panel when the condition selected by the selecting section is at least one of the completely blind condition, the weak-sighted condition and the hearing condition.

According to the apparatus, when the condition of the handicapped person is at least one of the completely blind condition, the weak-sighted condition and the hearing condition, because the operation guide is outputted with sounds, it is possible that the handicapped person operates the image forming apparatus easily.

Preferably, the above-described apparatus further comprises a sound volume specifying section for specifying sound volume of the operation guide outputted by the guide section, when the condition of the handicapped person selected by the selecting section is the hearing condition.

According to the apparatus, when the condition of the handicapped person is the hearing person, it is possible to specify the sound volume of the operation guide with sounds, for example, to specify the higher sound volume than usual. Consequently, when the condition of the handicapped person is the hearing condition, it is possible to adjust the sound volume of the operation guide so that the handicapped person can hear the operation guide easily.

Preferably, in the above-described apparatus, the storage further stores a display function provided for the display, when the condition of the handicapped person selected by the selecting section is at least one of the hearing condition and the weak-sighted condition, and the operation function changing section changes the display function of the display on the basis of the display function stored in the storage, when the condition of the handicapped person selected by the selecting section is at least one of the hearing condition and the weak-sighted condition.

According to the apparatus, when the condition of the handicapped person is at least one of the hearing condition and the weak-sighted condition, because the display function is changed, for example, it is possible to change luminance, a contrast, light quantity or the like of the display. Consequently, when the condition of the handicapped person is at least one of the hearing condition and the weak-sited condition, it is possible to adjust brightness of the display so as to be seen easily.

Preferably, in the above-described apparatus, the storage further stores a display function to enlarge and display an operation instruction content displayed on the display, and a display size, when the condition of the handicapped person selected by the selecting section is the weak-sited condition, and the operation function changing section enlarges and displays the operation instruction content to be displayed on the display on the basis of the display function and the display size stored in the storage, when the condition of the handicapped person selected by the selecting section is the weak-sighted condition.

According to the apparatus, the condition of the handicapped person is the weak-sighted person, because the operation instruction content to be displayed on the display is enlarged and displayed on the display, it is possible to adjust the operation instruction content so as to be seen easily.

Preferably, in the above-described apparatus, the storage further stores a specified display color of the display, when the condition of the handicapped person selected by the selecting section is at least one of the weak-sited condition and the color-blind condition, and the operation function changing section changes display colors of the display on the basis of the specified display color stored in the storage, when the condition of the handicapped person selected by the selecting section is at least one of the weak-sited condition and the color blind condition.

According to the apparatus, when the condition of the handicapped person is at least one of the weak-sighted condition and the color-blind condition, because the display colors of the display are changed on the basis of the specified display color, it is possible to adjust the display so as to be seen easily.

Preferably, in the above-described apparatus, the storage further stores a specified recognition time of an operation on the operation panel, when the condition of the handicapped person selected by the selecting section is the slow action condition, and the operation function changing section changes a recognition time of the operation on the operation panel on the basis of the specified recognition time stored in the storage, when the condition of the handicapped person selected by the selecting section is the slow action condition.

According to the apparatus, when the condition of the handicapped person is the slow action condition, because the recognition time of the operation of the operation panel is changed, it is possible to determine the most suitable recognition time.

Preferably, the above-described apparatus further comprises an angle changing section for changing an angle of an operation surface of the operation panel, wherein the storage further storages a specified angle of the operation surface of the operation panel when the condition of the handicapped person selected by the selecting section is the wheelchair condition, and the operation function changing section changes an angle of the operation surface of the operation panel by the angle changing section on the basis of the specified angle stored in the storage, when the condition of the handicapped person selected by the selecting section is the wheelchair condition.

According to the apparatus, when the condition of the handicapped person is the wheelchair condition, because the angle of the operation surface of the operation panel is changed, it is possible to adjust the angle so that the operation panel is seen easily.

Preferably, in the above-described apparatus, the operation function changing section cancels the operation function changed according to the condition of the handicapped person selected by the selecting section, and changes the operation function of the operation panel for the normal healthy person on the basis of the operation function corresponding to the normal healthy person stored in the storage.

According to the apparatus, when the user is the normal healthy person, the operation function of the operation panel changed according to the handicapped person is canceled, and the operation function corresponding to the normal healthy person is applied to the operation panel. Consequently, it is possible to apply the operation function which the normal healthy person can use easily to the operation panel. Further, because the most suitable operation of the image forming apparatus is provided for the user, it is possible that the normal healthy person and the handicapped person use the image forming apparatus in common.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein:

FIG. 1 is a block diagram showing an internal structure of an image forming apparatus 1;

FIG. 2 is a schematic view showing an operation panel 12 of the image forming apparatus 1;

FIGS. 3A and 3B are flowcharts showing a flow of a mode setting processing;

FIGS. 4A and 4B are flowcharts showing a flow of a condition changing processing;

PREFERRED EMBODIMENTS OF THE INVENTION

Figure 3A:
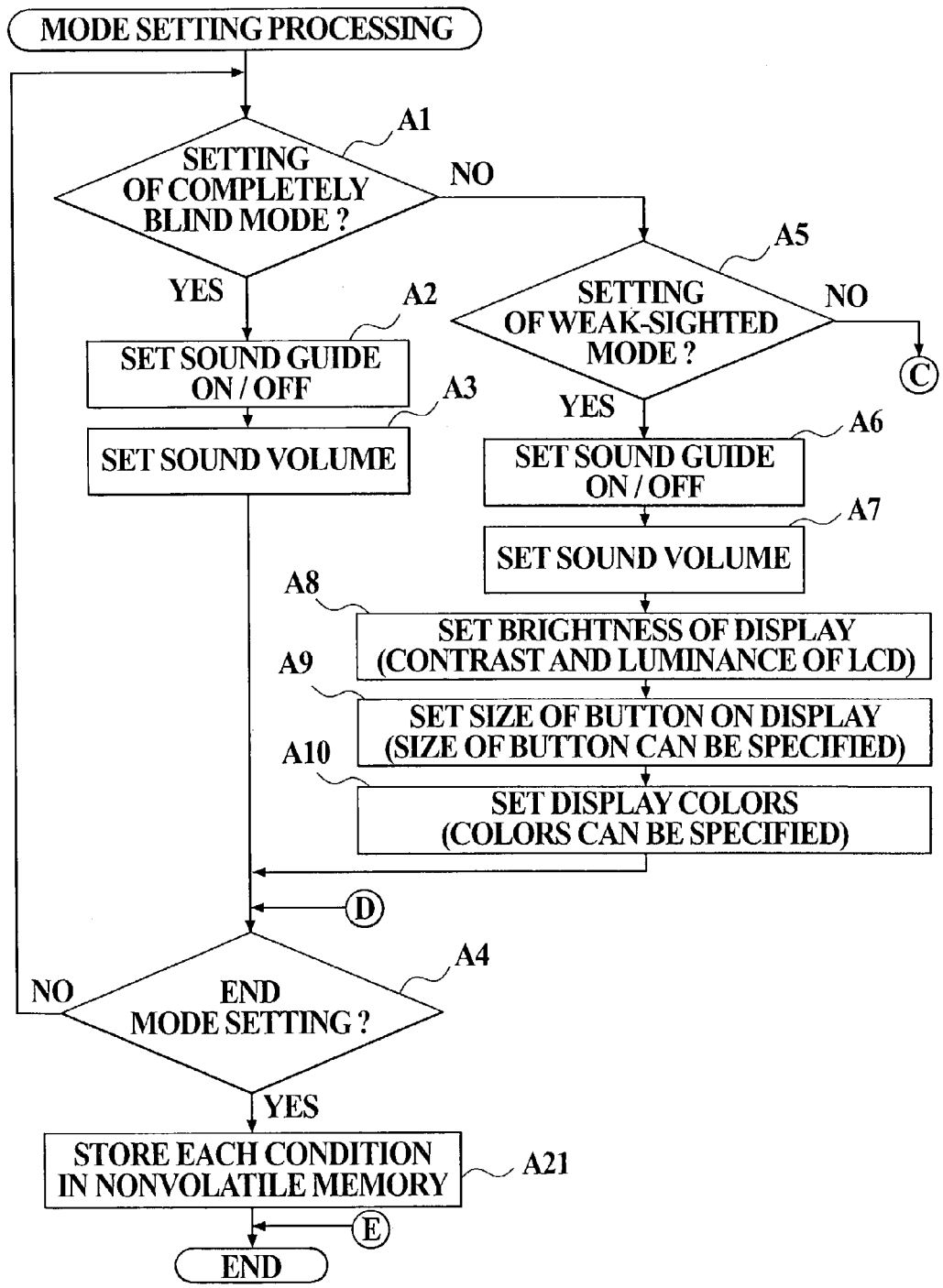

Hereinafter, an embodiment of an image forming apparatus 1 to which the present invention is applied will be described in detail, with reference to FIGS. 1 to 6.

According to the present embodiment, a normal healthy person/handicapped person switch SW 12d as follows functions as the specifying section claimed in claims of the present invention, a nonvolatile memory 15 functions as the memory, a controller 11 functions as the operation function changing section, a tough panel 12b functions as the selecting section, a speaker section 12e functions as the guide section, and a driving section 13 functions as the angle changing section.

First, the structure will be explained as follows.

FIG. 1 is a block diagram showing an internal structure of the image forming apparatus 1.

As shown in FIG. 1, the image forming apparatus 1 comprises a controller 11, an operation panel 12, a driving section 13, a RAM 14, a nonvolatile memory 15, an image reading section 16, an image forming section 17 and an output section 18, which are connected to each other through a bus 19.

The controller 11 consists of a CPU (Central Processing Unit) or the like. The controller 11 develops a program specified of a system program stored in the nonvolatile memory 15, and an image reading program or an image forming program corresponding to the system program, in a work area of the RAM 14, which is not shown in figures, and controls each section according to the specified program. The controller 11 performs an image reading processing or an image forming processing according to the program developed in the RAM 14, and displays a process of the processing on a liquid crystal display 12a.

Further, the controller 11 performs a mode setting processing (which is described with reference to FIGS. 3A and 3B) for setting an operation mode of the operation panel 12 corresponding to handicapped persons, and a condition changing processing (which is described with reference to FIGS. 4A and 4B) for changing a condition of the operation mode.

According to the mode setting processing, the controller 11 determines a sound guide, sound volume, brightness of the display, display colors, recognition time of operation buttons, an angle of the operation panel 12 or the like, thought the operation panel 12, according to each of a completely blind mode, a weak-sighted mode, a color-blind mode, a hearing mode, a slow action mode and a wheelchair mode which are operation modes for handicapped persons.

Thereafter, the controller 11 stores the condition determined in each mode, in the nonvolatile memory 15.

According to the condition changing processing, the controller 11 determines whether the present mode is the normal healthy person mode or the handicapped person mode, on the switching condition of the normal healthy person/handicapped person switch SW 12d provided on the operation panel 12. When the controller 11 determines that the present mode is the normal healthy person mode, the controller 11 applies an operation function based on a usual condition stored in a normal healthy person data file 15b to the operation panel 12. When the controller 11 determines that the present mode is the handicapped person mode, the controller 11 applies an operation function based on a condition corresponding to the completely blind mode, the weak-sighted mode, the color-blind mode, the hearing mode, the slow action mode or the wheelchair mode, stored in a handicapped person data file 15a to the operation panel 12.

The operation panel 12 will be explained with reference to FIG. 2.

FIG. 2 is a schematic view showing the operation panel 12. As shown in FIG. 2, the operation panel 12 comprises the liquid crystal display 12a, the touch panel 12b, a numeric keypad 12c, the normal healthy person/handicapped person switch SW 12d, and the speaker section 12e.

Figure 5A:
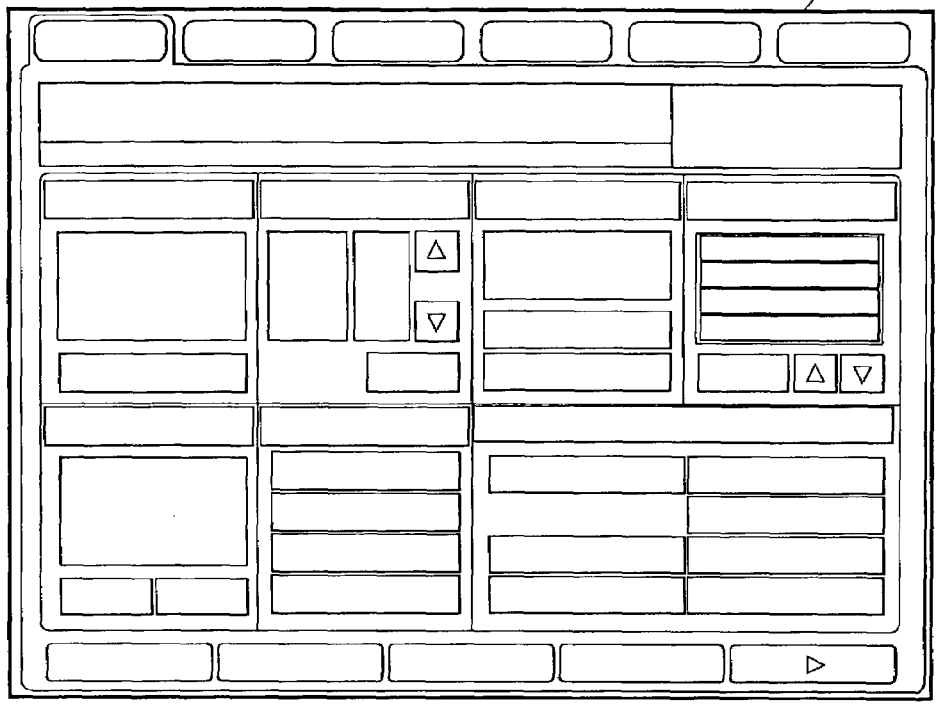
FIGS. 5A and 5B are views showing examples of screens of a liquid crystal display 12a of the image forming apparatus 1.
Figure 5B:
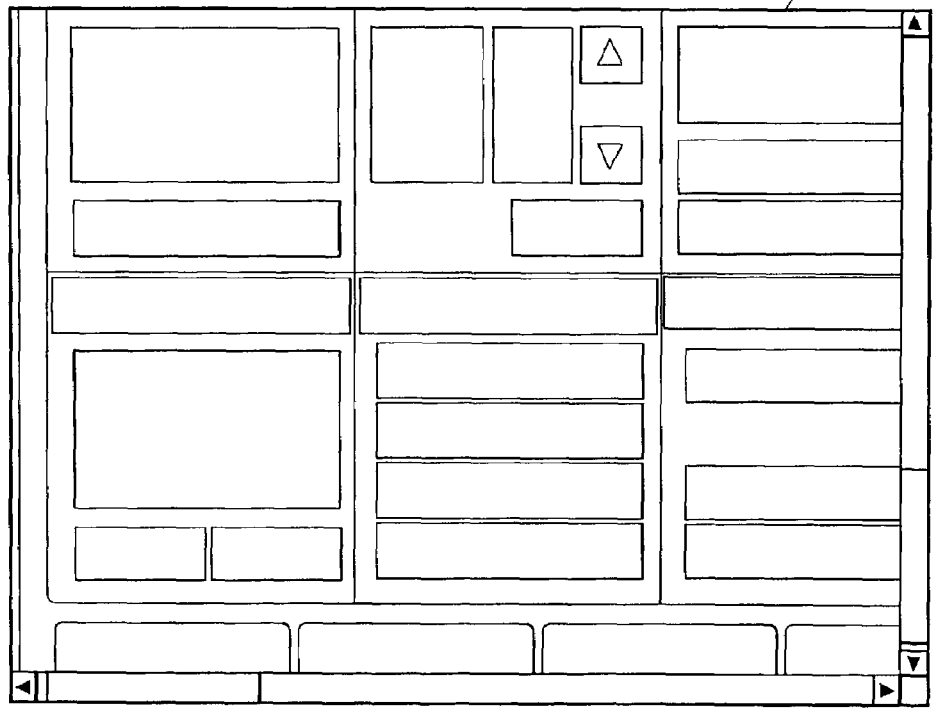

The liquid crystal display 12a generates a display signal based on display data outputted from the controller 11, and displays various images on a screen thereof. For example, the liquid crystal display 12a displays buttons or the like for determining various conditions for forming images, as shown in FIGS. 5A and 5B.

The touch panel 12b is combined with the screen of the liquid crystal display 12a as one, as shown in FIG. 2. The touch panel 12b outputs a coordinate signal of a position pushed with a finger or the like, to the controller 11.

The numeric keypad 12c consists of a key board comprising numeric keys (numeric input keys) for specifying the number of output copies of images, a clear key for releasing the condition of the number of output copies specified, a start key for starting outputting images, various function keys or the like. The numeric keypad 12c outputs a signal of key pushed to the controller 11.

The normal healthy person/handicapped person switch SW 12d consists of a toggle switch. The normal health person/handicapped person switch SW 12d switches between the normal healthy person mode and the handicapped person mode alternatively, even when operated, and outputs a mode signal to the controller 11.

The speaker section 12e comprises a speaker, a D/A converter, an amplifier or the like. When the D/A converter converts sound guide data read out of a sound guide data file 15c of the nonvolatile memory 15 by the controller 11 to an analog sound signal, the amplifier amplifies the analog sound signal to sound volume specified. Then, the sound is outputted from the speaker.

Figure 6:
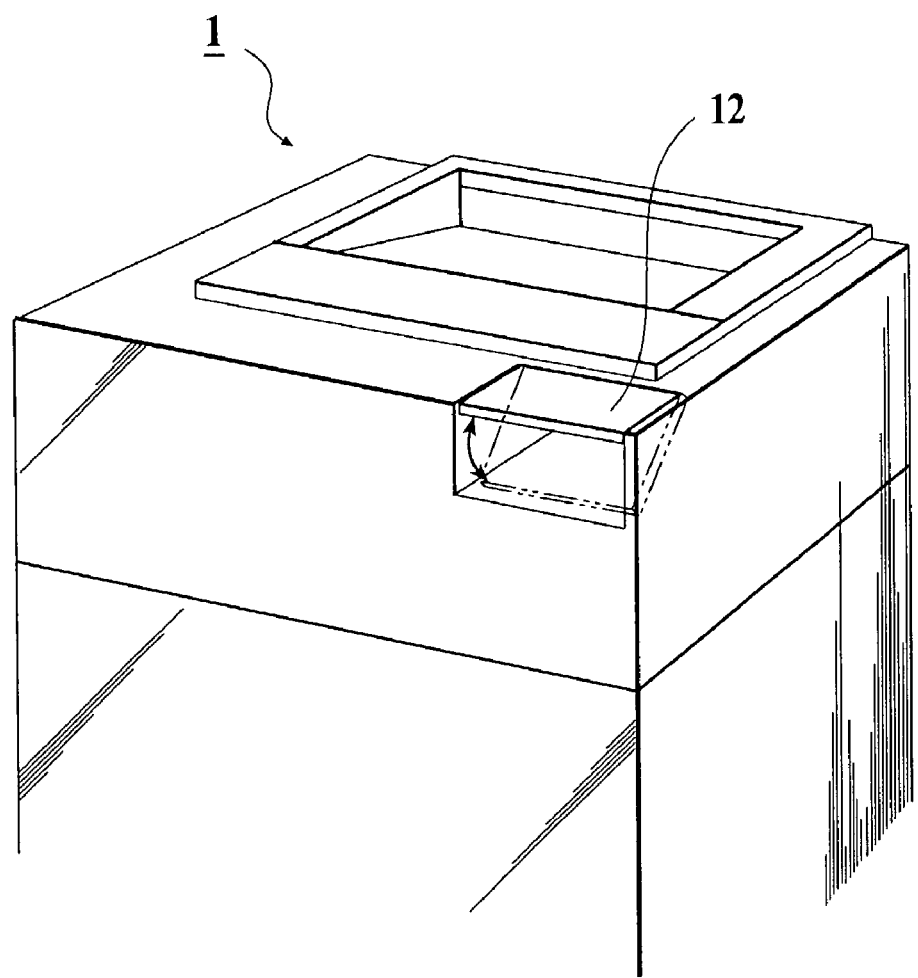
FIG. 6 is a view showing a change in an angle of the operation panel 12 of the image forming apparatus 1.

The driving section 13 is connected to a back portion of the operation panel 12, as shown in FIG. 2. The angle of the operation surface of the operation panel 12 to the operator is controlled by the driving section 13. Therefore, for example, the angle of the operation surface of the operation panel 12 is changed as shown in FIG. 6.

The driving section 13 comprises a driving mechanism including a stepping motor, which is not shown in figures. The driving section 13 drives and rotates the stepping motor on the basis of angle data outputted from the controller 11. Therefore, the angle of the operation panel 12 is controlled as shown in FIG. 6.

The RAM (Random Access Memory) 14 has a work memory area for storing the application program specified as described above, inputted instructions, inputted data, results of the processing or the like.

The nonvolatile memory 15 comprises storage means in which contents are not eliminated even if the image forming apparatus 1 is turned off. For example, the nonvolatile memory 15 includes a PROM (Programmable Read-Only Memory), an EPROM (Erasable Programmable ROM), an EEPROM (Electrically Erasable Programmable ROM) and so on.

The nonvolatile memory 15 previously stores the system program of the image forming apparatus 1, and various application programs or data corresponding to the system. All or one part of the program, data or the like stored in the nonvolatile memory 15 may be transmitted to a communication controller which is not shown in figures through a transmission medium such as a network line or the like from another apparatus (for example, a personal computer).

The nonvolatile memory 15 stores the handicapped person data file 15*a*, the normal healthy person data file 15*b*, the sound guide data file 15*c* and a color data file 15*d* therein. Herein, the handicapped person data file 15*a* stores the condition of the following mode setting processing shown in FIGS. 3A and 3B, that is, the condition of the operation function corresponding to handicapped persons. The normal healthy person data file 15*b* stores the condition of the operation function corresponding to normal healthy persons, that is, the usual condition. The sound guide data file 15*c* stores sound guide data for guiding handicapped persons (for example, the completely blind, the weak-sighted person, the hearing person or the like) with sounds in operating the image forming apparatus 1. The color data file 15*d* stores color data used when changing display colors of the liquid crystal display 12*a*.

The image reading section 16 comprises a scanner under a contact grass on which copies are placed, and makes the scanner read images of the copies. The scanner comprises a light source, a lens, a CCD (Charge Coupled Device) or the like. When the scanner irradiates light emitted from the light source to the copy, scans the copy with the light, forms an image on the basis of reflections of the light, and converts the image electrically, the image of the copy is read. Then, the image reading section 16 outputs the image read by the scanner to the image forming section 17. Herein, the image is not limited to image data such as a figure, a photograph or the like. The image includes text data or the like, such as a character, a signal or the like.

The image forming section 17 performs the image processing for enlarging or reducing the size of the image outputted from the image reading section 16, rotating the image, changing the position of the image or the like, according to the instruction inputted through the touch panel 12*b* or the numeric keypad 12*c*. Thereafter, the image forming section 17 outputs the image processed according to the processing to the output section 18.

The output section 18 comprises a photosensitive drum, a toner section, a paper output section, a feeder, or the like. The output section 18 controls the feeder to feed the printing paper having the size in the direction inputted through the touch panel 12*b* or the numeric keypad 12*c*, and exposes the photosensitive drum to form the electrostatic latent image of the image outputted from the image forming section 17, according to the printing instruction outputted from the controller 11. Then, the output section 18 forms a toner image based on the electrostatic latent image, transcribes and fixes the toner image on the printing paper, and the output section 18 outputs the printing paper from the paper output section.

Next, the operation will be explained.

First, the mode setting processing for storing the condition of the operation function corresponding to the condition of the handicapped person in the handicapped person data file 15*a*, will be explained.

First, an operator such as a service person instructs the image forming apparatus 1 to generate "the handicapped person data" through various function keys included in the numeric keypad 12*c* on the operation panel 12 of the image forming apparatus 1. Therefore, the controller 11 of the image forming apparatus 1 performs the mode setting processing as shown in FIGS. 3A and 3B.

FIGS. 3A and 3B are flowcarts showing the mode setting processing performed by the image forming apparatus 1.

According to the mode setting processing, the controller 11 of the image forming apparatus 1 displays a mode specifying screen which is not shown in figures, for specifying a mode such as the completely blind mode, the weak-sighted mode, the color-blind mode, the hearing mode, the slow action mode, the wheeling mode or the like, on the liquid crystal display 12*a*.

The controller 11 receives the mode specified on the mode specifying screen, according to the condition of the handicapped person using the operating panel 12*b*. At the time, a plurality of modes according to the condition of the handicapped person using the operation panel 12*b*, may be specified on the mode specifying screen.

When the completely blind mode is specified on the mode specifying screen which is not shown in figures (Step A1, YES), the controller 11 sets the sound guide ON (Step A2). Then, when the controller 11 makes the operator specify the sound volume through the numeric keypad 12*c*, the controller 11 stores data corresponding to the sound volume in the RAM 14 (Step A3). Thereafter, the controller 11 performs the processing in Step A4.

When the weak-sighted mode is specified on the mode specifying screen which is not shown in figures (Step A1; NO-Step A5; YES), the controller 11 sets the sound guide ON (Step A2), makes the operator specify the sound volume through the numeric keypad 12*c*, and stores data corresponding to the sound volume in the RAM 14 (Step A7). Then, when the controller 11 makes the operator specify the brightness (contrast and luminance) of the liquid crystal display 12*a* through the numeric keypad 12*c*, the controller 11 stores data corresponding to the brightness in the RAM 14 (Step A8). Then, when the controller 11 makes the operator specify the size of the button enlarged and displayed on the liquid crystal display 12*a* through the numeric keypad 12*c*, the controller 11 stores data corresponding to the size in the RAM 14 (Step A9) Then, when the controller 11 makes the operator specify the display colors of the liquid crystal display 12*a* through the numeric keypad 12*c*, the controller 11 extracts color data corresponding to the display colors from the color data file 15*d*, and stores the color data in the RAM 14 (Step A10). Thereafter, the controller 11 performs the processing in Step A4.

When the color-blind mode is specified on the mode specifying screen which is not shown in figures (Step A1; NO-Step A5; NO-Step A11; YES), the controller 11 makes the operator specify display colors through the numeric keypad 12*c*, extracts color data corresponding to the display colors from the color data file 15*d*, and stores the color data in the RAM 14 (Step A12). Thereafter, the controller 11 performs the processing in Step A4.

When the hearing mode is specified on the mode specifying screen which is not shown in figures (Step A1; NO—Step A5; NO—Step A11; NO—Step A13; YES), the controller 11 sets the sound guide ON (Step A14). Then, when the controller 11 makes the operator specify the sound volume through the numeric keypad 12c, the controller 11 stores data corresponding to the sound volume in the RAM 14 (Step A15). Then, when the controller 11 makes the operator specify the brightness (contrast and luminance) of the liquid crystal display 12a through the numeric keypad 12c, the controller 11 stores data corresponding to the brightness in the RAM 14 (Step A16). Thereafter, the controller 11 performs the processing in Step A4.

When the slow action mode is specified on the mode specifying screen which is not shown in figures (Step A1; NO-Step A5; NO-Step A11; NO-Step A13; NO-Step A17; YES), the controller 11 makes the operator specify recognition time of operation buttons or the numeric keypad 12c displayed on the liquid crystal display 12a through the numeric keypad 12c, and stores data corresponding to the recognition time in the RAM 14 (Step A18). Thereafter, the controller 11 performs the processing in Step A4.

When the wheelchair mode is specified on the mode specifying screen which is not shown in figures (Step A1; NO-Step A5; NO-Step A11; NO-Step A13; NO-Step A17; NO-Step A19; YES), the controller 11 makes the operator specify the angle of the operation panel 12 through the numeric keypad 12c, and stores data corresponding to the angle in the RAM 14 (Step A20) Thereafter, the controller 11 performs the processing in Step A4.

Then, the controller 11 determines whether the setting of the mode specified on the mode specifying screen which is not shown in figures is finished or not (Step A4). When the controller 11 determines that the setting of the mode specified is not finished (Step A4; NO), the controller 11 performs the processing in Step A1 again, in order to set another mode. On the other hand, when the controller 11 determines that the setting of the mode specified on the mode specifying screen which is not shown in figures is finished (Step A4; YES), the controller 11 relates the condition to the name of the mode, and stores them in the handicapped person data file 15a of the nonvolatile memory 15 (Step A21). Thereafter, the controller 11 finishes the mode setting processing shown in FIGS. 3A and 3B.

Next, the condition changing processing for changing the condition of the operation function corresponding to the normal healthy person or the handicapped person will be explained with reference to FIGS. 4A and 4B.

FIGS. 4A and 4B are flowcharts showing the condition changing processing performed by the image forming apparatus 1.

As shown in FIG. 4A, the controller 11 determines whether the mode set at present is the normal healthy person mode or the handicapped person mode on the basis of the condition of the normal healthy person/handicapped person switch SW 12d (Step B1).

When determining that the present mode is the normal healthy person mode in Step B1 (Step B1; the normal healthy person mode), the controller 11 cancels the condition stored in the handicapped person data file 15a (Step B2). Then, the controller 11 obtains usual data stored in the normal healthy person data file 15b. Then, the controller 11 sets back the usual condition on the basis of the usual data. More specifically, the controller 11 changes the brightness and the display colors of the liquid crystal display 12a (Step B3), and changes the recognition time of the buttons, the numeric key 12c and the normal healthy person/handicapped person switch SW 12d displayed on the liquid crystal display 12a (Step B4). Then, when the controller 11 generates angle data corresponding to the usual angle of the operation panel 12 and outputs it to the driving section 13, the driving section 13 operates and rotates, and thereby adjusts the angle of the operation panel 12 (Step B5). Then, the controller 11 sets the sound guide OFF (Step B6), and changes the size of the buttons displayed on the display screen (Step B7). Thereafter, the controller 11 finishes the condition changing processing shown in FIGS. 4A and 4B.

When determining that the present mode is the handicapped person mode in Step B1 (Step B1; the handicapped person mode), the controller 11 determines whether the completely blind mode is specified or not with reference to the handicapped person data file 15a (Step B8). When determining that the completely blind mode is not specified (Step B8; NO), the controller 11 performs the processing in Step B11. On the other hand, when determining that the completely blind mode is specified (Step B8; YES), the controller 11 extracts data corresponding to the sound volume from the handicapped person data file 15a, and specifies the sound volume of the speaker section 12e (Step B9). Then, when the controller 11 reads the sound guide data out of the sound guide data file 15c, the controller 11 outputs the sound guide from the speaker section 12e (Step B10). Thereafter, the controller 11 performs the processing in Step B11.

Next, the controller 11 determines whether the weak-sited mode is specified or not with reference to the handicapped person data file 15a (Step B11). When determining that the weak-sighted mode is not specified (Step B11; NO), the controller 11 performs the processing in Step B17. On the other hand, when determining that the weak-sighted mode is specified (Step B11; YES), the controller 11 confirms that the sound guide is not started, extracts data corresponding to the sound volume from the handicapped person data file 15a, and specifies the sound volume of the speaker section 12e (Step B12) Then, when the controller 11 reads the sound guide data out of the sound guide data file 15c, the controller 11 outputs the sound guide from the speaker section 12e (Step B13).

Then, when the controller 11 extracts data corresponding to the brightness (contrast and luminance) of the liquid crystal display 12a from the handicapped person data file 15a, the controller 11 changes the gradation voltage applied to the liquid crystal display 12a (more specifically, TFT elements) on the basis of the data (Step B14). Then, when the controller 11 extracts data corresponding to the size of the button displayed on the liquid crystal display 12a from the handicapped person data file 15a, the controller 11 changes the size of the button displayed on the liquid crystal display 12a on the basis of the data (Step B15). For example, the controller 11 usually enlarges the size of the button displayed on the liquid crystal display 12a shown in FIG. 5A to the size of the button displayed on the liquid crystal display 12a shown in FIG. 5B. Then, the controller 11 changes the display colors of the liquid crystal display 12a on the basis color data corresponding to the display colors stored in the handicapped person data file 15a (Step B16). Thereafter, the controller 11 performs the processing in Step B17.

Then, the controller 11 determines whether the color-blind mode is specified or not with reference to the handicapped person data file 15a (Step B17). When determining that the color-blind mode is not specified (Step B17; NO), the controller 11 performs the processing in Step B19. On the other hand, when determining that the color-blind mode is specified (Step B17; YES), the controller 11 changes the display colors of the liquid crystal display 12a on the basis of color data corresponding to the display colors stored in the handicapped person data file 15a (Step B18). Thereafter, the controller 11 performs the processing in Step B19.

Then, the controller 11 determines whether the hearing mode is specified or not with reference to the handicapped person data file 15a (Step B19). When determining that the hearing mode is not specified (Step B19; NO), the controller 11 performs the processing in Step 23. On the other hand, when determining that the hearing mode is specified (Step B19; YES), the controller 11 confirms that the sound guide is not started, extracts data corresponding to the sound volume from the handicapped person data file 15a, and specifies the sound volume of the speaker section 12e (Step B20). Then, when the controller 11 reads the sound guide data out of the sound guide data file 15c, the controller 11 outputs the sound guide from the speaker section 12e (Step B21).

Then, when the controller 11 extracts data corresponding to the brightness (contrast and luminance) of the liquid crystal display 12a from the handicapped person data file 15a, the controller 11 changes the gradation voltage applied to the liquid crystal display 12a (more specifically, TFT elements) on the basis of the data (Step B22). Thereafter, the controller 11 performs the processing in Step B23.

Then, the controller 11 determines whether the slow action mode is specified or not with reference to the handicapped person data file 15a (Step B23). When determining that the slow action mode is not specified (Step B23; NO), the controller 11 performs the processing in Step B25. On the other hand, when determining that the slow action mode is specified (Step B23; YES), the controller 11 extracts data corresponding to the recognition time of the buttons and the numeric keypad 12c displayed on the liquid crystal display 12a from the handicapped person data file 15a, and changes the recognition time of the buttons and the numeric keypad 12c displayed on the liquid crystal display 12a on the basis of the data (Step B24). Thereafter, the controller 11 performs the processing in Step B25.

Then, the controller 11 determines whether the wheelchair mode is specified or not with reference to the handicapped person data file 15a (Step B25) When determining that the wheelchair mode is not specified (Step B25; NO), the controller 11 finishes the condition changing processing shown in FIGS. 3A and 3B. On the other hand, when determining that the wheelchair mode is specified (Step B25; YES), the controller 11 extracts data corresponding to the angle of the operation panel 12 from the handicapped person data file 15a. Then, when the controller 11 generates angle data on the basis of the data and outputs it to the driving section 13, the driving section 13 adjusts the angle of the operation panel 12 (Step B26). For example, the controller 11 makes the driving section 13 adjust the angle of the operation panel 12 as shown in FIG. 6. Thereafter, the controller 11 finishes the condition changing processing shown in FIGS. 4A and 4B.

As described above, the controller 11 determines whether the present mode is the normal healthy person mode or the handicapped person mode on the basis of the condition of the normal healthy person/handicapped person switch SW 12d. Then, in case of the normal health person mode, the controller 11 applies the operation function based on the usual condition stored in the normal healthy person data file 15b to the operation panel 12. On the other hand, in case of the handicapped person mode, the controller 11 applies the operation function based on the condition (the condition corresponding to the completely blind mode, the weak-sighted mode, the color-blind mode, the hearing mode, the slow action mode or the wheelchair mode) stored in the handicapped person data file 15a to the operation penal 12.

More specifically, when the condition of the handicapped person is the completely blind condition, the weak-sited condition or the hearing condition, the controller 11 starts the sound guide with the sound volume based on the condition from the speaker section 12e. When the condition of the handicapped person is the weak-sighted condition or the hearing condition, the controller 11 changes the brightness of the liquid crystal display 12a. When the condition of the handicapped person is the weak-sighted condition or the color-blind condition, the controller 11 changes the display colors of the liquid crystal display 12a. When the condition of the handicapped person is the weak-sighted condition, the controller 11 changes the size of the buttons displayed on the liquid crystal display 12a. When the condition of the handicapped person is the slow action condition, the controller 11 changes the recognition time of the buttons, the numeric keypad 12c and the normal healthy person/handicapped person switch SW 12d displayed on the liquid crystal display 12a. When the condition of the handicapped person is the wheelchair condition, the controller 11 makes the driving section 13 adjust the angle of the operation panel 12.

Accordingly, it is possible to provide the image forming apparatus 1 that the most suitable operation functions to the normal healthy person and the handicapped person are applied to the operation panel 12, in consideration of the use of both the normal healthy person and the handicapped person.

Although the display section disposed for the operation panel 12 has been explained with the liquid crystal display 12a according to the above-described embodiment, it is not limited to the liquid crystal display 12a. The display section may consist of the liquid crystal display 12a and a LED, or only a LED. When a LED may be used as the display section, light volume of the LED may be adjusted in order to adjust the brightness of the display section.

Further, although it has been explained that the gradation voltage applied to the liquid crystal display 12a is changed in order to change the brightness of the liquid crystal display 12a according to the above-described embodiment, it is not limited to this embodiment. For example, when the liquid crystal display 12a comprises a back light, light volume of the back light may be adjusted in order to change the brightness of the liquid crystal display 12a.

Further, although it has been explained that the sound guide is set ON when the condition of the handicapped person is the completely blind condition, the weak-sighted condition or the hearing condition according to the above-described embodiment, it is not limited to this embodiment. The sound guide may be set ON or OFF as necessary.

Further, although it has been explained that the mode according to the condition of the handicapped person is stored in the handicapped person data file 15a in the mode setting processing shown in FIGS. 3A and 3B performed by the image forming apparatus 1 according to the above-described embodiment, it is not limited to this embodiment. For example, the condition of the mode corresponding to the condition of the handicapped person may be previously stored in a nonvolatile memory of a personal computer or the like, and the data stored in the nonvolatile memory may be used. In the case, an operation unit of the personal computer, for example, a keyboard, a mouse, a touch panel or the like may function as the selecting section.

Further, although it has been that the size of the button displayed on the liquid crystal display 12a is changed (enlarged) when the condition of the handicapped person is the weak-sited condition according to the above-described embodiment, it is not limited to this embodiment. The size of the operation instruction content displayed on the button and the size of another operation instruction content displayed on the liquid crystal display 12a may be changed (enlarged).

Although the present invention has been explained according to the above-described embodiment, it should also be understood that the present invention is not limited to the embodiment and various changes and modifications may be made to the invention without departing from the gist thereof.

According to the present invention, because the operation function of the operation panel is changed according to the user, it is possible to improve the operation of the image forming apparatus in view that normal healthy persons and handicapped persons use the image forming apparatus.

According to the present invention, it is possible to easily specify whether the user is the normal healthy person or the handicapped person by switching the toggle switch alternatively. Further, because the user is always specified, it is possible to smoothly change the operation function according to the user. Furthermore, because the user can be specified by one toggle switch, it is possible to reduce cost of the apparatus.

According to the present invention, for example, it is possible to change the condition such as the sound guide of the operation panel, sound volume, brightness of the display, display colors, the recognition time of operation buttons displayed on the display, the angle of the operation panel or the like, according to the condition of the handicapper person (the completely blind condition, the weak-sighted condition, the color-blind condition, the hearing condition, the slow action condition, or the wheelchair condition). As a result, it is possible to improve the operation of the image forming apparatus for handicapped persons.

According to the present invention, because a plurality of conditions of the handicapped person can be selected, it is possible to apply operation functions corresponding to the plurality of conditions of the handicapped person to the operation panel. Consequently, for example, when the condition of the handicapped person includes the completely blind condition and the wheelchair condition, it is possible to change the angle of the operation panel with outputting the sound guide of the operation panel. As a result, it is possible to provide the most suitable operation environment of the image forming apparatus for the handicapped person.

According to the present invention, when the condition of the handicapped person is at least one of the completely blind condition, the weak-sighted condition and the hearing condition, because the operation guide is outputted with sounds, it is possible that the handicapped person operates the image forming apparatus easily.

According to the present invention, when the condition of the handicapped person is the hearing person, it is possible to specify the sound volume of the operation guide with sounds, for example, to specify the higher sound volume than usual. Consequently, when the condition of the handicapped person is the hearing condition, it is possible to adjust the sound volume of the operation guide so that the handicapped person can hear the operation guide easily.

According to the present invention, when the condition of the handicapped person is at least one of the hearing condition and the weak-sighted condition, because the display function is changed, for example, it is possible to change luminance, the contrast, light quantity or the like of the display. Consequently, when the condition of the handicapped person is at least one of the hearing condition and the weak-sited condition, it is possible to adjust brightness of the display so as to be seen easily.

According to the present invention, the condition of the handicapped person is the weak-sighted person, because the operation instruction content to be displayed on the display is enlarged and displayed on the display, it is possible to adjust the operation instruction content so as to be seen easily.

According to the present invention, when the condition of the handicapped person is at least one of the weak-sighted condition and the color-blind condition, because the display colors of the display are changed on the basis of the specified display color, it is possible to adjust the display so as to be seen easily.

According to the present invention, when the condition of the handicapped person is the slow action condition, because the recognition time of the operation of the operation panel is changed, it is possible to determine the most suitable recognition time.

According to the present invention, when the condition of the handicapped person is the wheelchair condition, because the angle of the operation surface of the operation panel is changed, it is possible to adjust the angle so that the operation panel is seen easily.

According to the present invention, when the user is the normal healthy person, the operation function of the operation panel changed according to the handicapped person is canceled, and the operation function corresponding to the normal healthy person is applied to the operation panel. Consequently, it is possible to apply the operation function which the normal healthy person can use easily to the operation panel. Further, because the most suitable operation of the image forming apparatus is provided for the user, it is possible that the normal healthy person and the handicapped person use the image forming apparatus in common.

The entire disclosure of Japanese Patent Application No. Tokugan 2002-147753 filed on May 22, 2002 including specification, claims, drawings and summary are incorporated herein by reference in its entirety.

What is claimed is:

1. An image forming apparatus comprising an operation panel having a display and an input section, the apparatus comprising:
   a specifying section for specifying whether or not a user is handicapped;
   a selecting section to select a handicap condition;
   a storage section for storing a first operation function to be performed when the user is not handicapped, and a second operation function, corresponding to the selected handicap condition, to be performed when the user is handicapped; and
   an operation function changing section for reading the first and second operation functions out of the storage section, and for changing an operation function of the operation panel between the first and second operation functions based on whether the user is specified to be handicapped by the specifying section;
   wherein the operation function changing section reads from the storage section the second operation function corresponding to the selected handicap condition of the user before the specifying section specifies whether or not the user is handicapped.

2. The apparatus of claim 1, wherein the specifying section comprises a toggle switch for switching between first and second positions, and wherein one of the first and second positions indicates that the user is handicapped.

3. The apparatus of claim 2, wherein the operation function changing section cancels the second operation function changed according to the handicap condition selected by the selecting section, and changes the operation function of the operation panel to the first operation function after the second operation function is performed.

4. The apparatus of claim 1, wherein the handicap condition is selected from among a completely blind condition, a weak-sighted condition, a color-blind condition, a hearing condition, a slow action condition and a wheelchair condition.

5. The apparatus of claim 4, further comprising a guide section for outputting an operation guide with sounds, wherein the operation function changing section makes the guide section output the operation guide when the handicap condition selected by the selecting section is at least one of the completely blind condition, the weak-sighted condition and the hearing condition.

6. The apparatus of claim 5, further comprising a sound volume specifying section for specifying sound volume of the operation guide outputted by the guide section when the handicap condition selected by the selecting section is the hearing condition.

7. The apparatus of claim 4, wherein the storage section further stores a display function provided for the display when the handicap condition selected by the selecting section is at least one of the hearing condition and the weak-sighted condition, and wherein the operation function changing section changes the display function of the display based on the display function stored in the storage section when the handicap condition selected by the selecting section is at least one of the hearing condition and the weak-sighted condition.

8. The apparatus of claim 7, wherein the display function operates to enlarge and display an operation instruction content displayed on the display, in an enlarged display size, when the handicap condition selected by the selecting section is the weak-sighted condition.

9. The apparatus of claim 4, wherein the storage section further stores a specified display color of the display when the handicap condition selected by the selecting section is at least one of the weak-sighted condition and the color-blind condition, and wherein the operation function changing section changes display colors of the display based on the specified display color stored in the storage section when the handicap condition selected by the selecting section is at least one of the weak-sighted condition and the color blind condition.

10. The apparatus of claim 4, wherein the storage section further stores a specified recognition time of an operation on the operation panel when the handicap condition selected by the selecting section is the slow action condition, and wherein the operation function changing section changes a recognition time of the operation on the operation panel based on the specified recognition time stored in the storage section when the handicap condition selected by the selecting section is the slow action condition.

11. The apparatus of claim 4, further comprising an angle changing section for changing an angle of an operation surface of the operation panel, wherein the storage section further stores a specified angle of the operation surface of the operation panel when the handicap condition selected by the selecting section is the wheelchair condition, and wherein the operation function changing section controls the angle changing section to change the angle of the operation surface of the operation panel based on the specified angle stored in the storage section when the handicap condition selected by the selecting section is the wheelchair condition.

12. The apparatus of claim 1, wherein the selecting section is capable of selecting a plurality of handicap conditions.

* * * * *